United States Patent [19]

O'Callaghan

[11] Patent Number: 5,430,552
[45] Date of Patent: Jul. 4, 1995

[54] DEVICE FOR PROGRAMMING A VIDEO RECORDER AND VIDEO RECORDER COMPRISING THE DEVICE

[75] Inventor: Fergus G. O'Callaghan, Eindhoven, Netherlands

[73] Assignee: U.S. Philips Corporation, New York, N.Y.

[21] Appl. No.: 826,184

[22] Filed: Jan. 17, 1992

Related U.S. Application Data

[63] Continuation of Ser. No. 567,856, Aug. 15, 1990, abandoned.

[30] Foreign Application Priority Data

Sep. 7, 1989 [NL] Netherlands ............... 8902241

[51] Int. Cl.⁶ ............... H04N 5/76; H04N 7/04
[52] U.S. Cl. ............... 358/335; 360/33.1; 348/468
[58] Field of Search ............... 358/310, 335, 142, 146, 358/147, 85, 149, 191.1, 194.1; 360/33.1, 69; H04N 5/76, 5/78, 5/781, 5/782, 5/783, 9/79, 7/14, 7/08, 7/04, 5/04, 5/50, 5/44, 5/92; 348/468

[56] References Cited

U.S. PATENT DOCUMENTS

| | | | |
|---|---|---|---|
| 4,719,510 | 1/1988 | Kinghorn | 358/142 |
| 4,786,982 | 10/1988 | Wakahara et al. | 358/335 |
| 4,890,321 | 12/1989 | Seth-Smith et al. | 358/86 |
| 4,891,703 | 1/1990 | Noudar | 358/147 |
| 4,894,714 | 1/1990 | Christis | 358/86 |
| 4,908,707 | 3/1990 | Kinghorn | 358/147 |
| 4,963,968 | 10/1990 | Bugg et al. | 358/142 |
| 4,977,455 | 12/1990 | Yomg | 358/146 |

OTHER PUBLICATIONS

"Funkshau", No. 7, 1989, pp. 62–65.
"Specification of the Domestic Video Programme Delivery Control System (PDC)", May 1989.

Primary Examiner—Tommy P. Chin
Assistant Examiner—Thai Tran
Attorney, Agent, or Firm—Brian J. Wieghaus

[57] ABSTRACT

An improved programming of a video recorder comprising a first step enables time information as included in a teletext page by, for example, the BBC to be identified as such. A second step enables the date detected from the teletext page to be incremented by one day in the case of date allocation for programs starting after midnight.

14 Claims, 2 Drawing Sheets

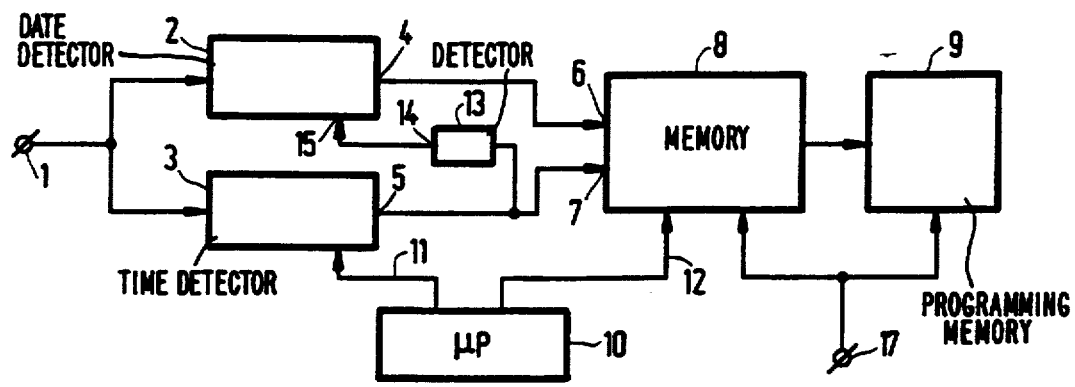
FIG.1
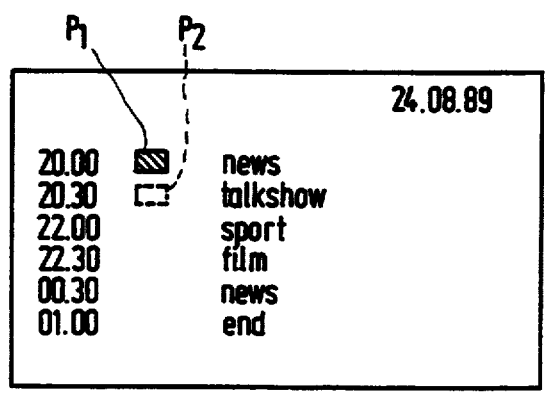
FIG.2
| | C1 | C2 | C3 | C4 |
|---|---|---|---|---|
| | start | stop | cursor pos | date |
| r1 | 20.00 | 20.30 | --- | 24.08 |
| r2 | 20.30 | 22.00 | --- | 24.08 |
| r3 | 22.00 | 22.30 | --- | 24.08 |
| r4 | 22.30 | 00.30 | --- | 24.08 |
| r5 | 00.30 | 01.00 | --- | 25.08 |
FIG.3
| start | stop | date |
|---|---|---|
| 20.30 | 22.00 | 24.08 |
| 22.30 | 00.30 | 24.08 |
| 00.30 | 01.00 | 25.08 |
FIG.4

DEVICE FOR PROGRAMMING A VIDEO RECORDER AND VIDEO RECORDER COMPRISING THE DEVICE

This is a continuation of application Ser. No. 07/567,856 filed Aug. 15, 1990 now abandoned.

BACKGROUND OF THE INVENTION

The invention relates to a device for programming a video recorder using time and date information contained in a teletext page which device comprises
- an input terminal for receiving the information contained in a teletext page,
- a date detector for detecting a date present in the information of the teletext page,
- a time detector for detecting a time present in the information of the teletext page, and to a video recorder comprising the device. A device of this type is described in the magazine "Funkschau", no. 7, 1989, pp. 62–65. This device is a VPT (Videorecorder-Programmierung mit Fernseh-Text) programming device of a video recorder.

The prior-art device has the drawback that during programming it happens quite often that information from the teletext page is misinterpreted, so that a wrong date or a wrong time is programmed.

SUMMARY OF THE INVENTION

It is an object of the invention to provide two steps enabling a video recorder to be programmed more accurately.

In order to implement the first step the device in accordance with the invention is characterized in that the time detector is adapted to detect time information from at least four consecutive characters in the information of the teletext page, in that in addition the time detector is adapted to detect four consecutive characters in the form of exactly four consecutive digits in the information of the teletext page, and in that the time detector is adapted to accept the four consecutive digits as a time if the time detector has not detected any time information in another form than exactly four consecutive digits in the information of the teletext page.

In order to implement the second step the device in accordance with the invention, which device is adapted to assign a date detected by the date detector to a time detected from a teletext page by the time detector, and is characterized in that if a time subsequently detected from the same teletext page by the time detector represents an instant prior to the previously detected time the device is adapted to assign a date incremented by one day to the detected time.

The invention is based on the recognition of the fact that the device should also perform to an optimum extent when a video recorder is programmed by means of teletext pages not composed in accordance with a specific standard such as for example the VPT standard.

A possible standard is described, for example, in the EBU/UER proposal "Specification of the domestic video programme delivery control system (PDC)" of March 1989.

In accordance with this standard the instants at which programs begin are expressed as follows in the teletext page: 20.00 for 8 p.m. and 09.30 for an instant before 10 a.m. In a non-standard VPT teletext page the time information may also be expressed differently, for example 20.00 for 8 p.m. and 9.30 or 9:30 or 09:30 for nine-thirty a.m.

This means that the time detector should be adapted to detect at least four consecutive characters in the information of the teletext page. If these characters take the form of one or two digits followed by a . (point) or a: (colon), which is followed by two further digits, the values for the three or four digits of course being such that they can denote a time, the time detector will detect the information as being a time.

A problem arises if a teletext page contains time information in a form as inserted in the BBC teletext pages, namely in the form of 2000 for the time 8 p.m. Simply detecting exactly four consecutive digits in a teletext page does not provide a solution because the teletext information may include years (for example "the film was made in the year 1955"), which may easily be misinterpreted as times (in the present example the time five to eight p.m.).

The first step now enables time information in a form as included in the teletext information by, for example, the BBC to be detected. It is then assumed that such a teletext page does not contain any time information expressed in a manner other than described hereinbefore.

Thus, a teletext page is examined for the presence of standard time information and time information which deviates slightly therefrom, and for exactly four consecutive characters in the form of four digits.

If the time detector detects four consecutive characters in the form of four digits acceptance or rejection of the four digits as a time will depend on whether the time detector also detects time information in a different form in the teletext page. If no time information in another form is found in the teletext page the four digits will be accepted as a time. In the other case they will be rejected.

Another problem which may occur in the case of non-standard teletext pages is the following. For programming on the basis of the information in a teletext page it is necessary to examine the teletext page first for the presence of date and time information. If the date detector detects a date and subsequently the time detector detects a time, this time is stored as the starting time of a program together with a data in a memory row.

If subsequently a time corresponding to the beginning of a second program is detected this time is stored as the starting time of the program together with the date in a second storage row. Moreover, the second time is stored in the first memory row as the end time of the first program. This proceeds in the same way for subsequent times in the teletext page.

However, television programs specified on a teletext page for a specific day (date) may continue until after midnight.

Thus, a program which begins after midnight would be given an incorrect date in accordance with the method described above.

However, the second step ensures that nevertheless the correct date is assigned to the starting time for programs starting after midnight.

BRIEF DESCRIPTION OF THE DRAWINGS

Embodiments of the invention will now be described in more detail, by way of example, with reference to the drawings. In the drawings FIG. 1 shows an embodiment of the device, FIG. 2 shows a teletext page, FIG. 3 shows the contents of the time and date memory in the device, FIG. 4 shows the contents of another time and date memory in the device.

DESCRIPTION OF THE PREFERRED EMBODIMENTS

Figure 5:
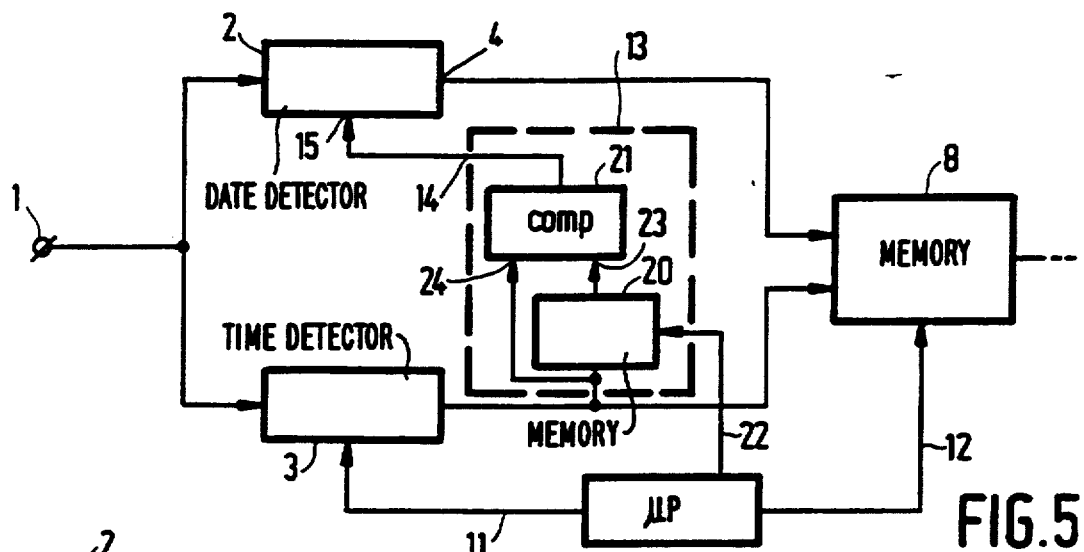
FIG. 5 shows the device of FIG. 1 in more detail.

FIG. 1 shows a first embodiment of the device, which has an input terminal 1 for receiving the teletext information. The information is applied to a date detector 2 and a time detector 3. A date detected from the information of a teletext page by the date detector 2 is transferred to an output 4. A time detected from this information by the time detector 3 is transferred to an output 5. The outputs 4 and 5 of the detectors 2 and 3 respectively are coupled to inputs 6 and 7 of a memory 8. The date detector 2 can detect a date expressed in different forms from the information of a teletext page. Possible forms of the date are:

24/8/
24.08
24-8-
24 Aug.

When it is known that the date in the teletext page is possibly specified in yet another manner, this can of course be allowed for in the detection by means of the detector 2. If the teletext page does not contain any date information, the date detector 2 cannot find any date information in the page. In that case the date detector can use the internal date of the video recorder as being the date.

The date thus detected by the detector 2 is available on the output 4 and is applied to the input 6 of the memory 8.

The time detector 3 can detect a time expressed in one of the following forms from the information of a teletext page:

uv.xy
uv:xy
v.xy
v:xy u (if present), v, x and y being characters in the form of digits, the number uv complying with $00 \leq uv \leq 24$ and the number xy complying with: $00 \leq xy \leq 59$. If there is no digit u this means that v complies with: $0 \leq v \leq 9$.

The above notations for the time may be standard notations. The detector 3 now detects six or seven consecutive characters, checks whether the first and the last character are not digits, and checks whether the other characters satisfy one of the above notations and requirements with regard to uv, v and xy. In the case of compliance the time thus detected is transferred to the output 5.

How a video recorder is programmed will now be described with reference to FIGS. 2, 3 and 4. By way of example FIG. 2 shows diagrammatically a teletext page as may be displayed on a television screen. The page contains the program transmitted by a certain station on Aug. 24, 1989.

In a first step the device searches the teletext page for the date and time information. The detector 2 detects 24 August as the date and transfers the date to the output 4. The time detector 3 detects time information which complies with one or more standard notations.

Under the influence of a control unit 10, which for this purpose supplies a control signal to the detector 3 by way of the line 11 the detected time 20.00 is transferred to the output 5.

Under the influence of a control signal applied to the memory 8 via the line 12, this time is stored as the starting time in a storage location $r_1$ (row 1), $c_1$ (column 1) of the memory 8. Likewise, the date is stored in the storage location $r_1$, $c_4$ (column 4) and the cursor position on the display screen, corresponding to the display screen coordinates of the location $P_1$, directly after the time "20.00" on the screen, is stored in the storage location $r_1$, $c_3$ (column 3) in the memory 8. FIG. 3 represents diagrammatically the contents of the memory 8.

Subsequently, under the influence of a control signal from the control unit 10, the second time "20.30" is transferred to the output 5. This time is stored as the starting time of the second program in the storage location $r_2$, $c_1$ and as the end time of the first program in the storage location $r_1$, $c_2$ in the memory 8. The cursor position $P_2$ (see FIG. 2) is stored in the storage location $r_2$, $c_3$ in the memory 8. Moreover, the date is stored in the storage location $r_2$, $c_4$, see FIG. 3.

Subsequently the third time "22.00" is stored as the starting time of the third program in the storage location $r_3$, $c_1$ and as the end time of the second program in the storage location $r_2$, $c_2$. The date and the cursor position are stored in the storage locations $r_3$, $c_4$ and $r_3$, $c_3$.

This continues until the time "00.30" appears on the output 5 of the detector 3. A detector 13, which has an input coupled to the output 5 of the detector 3, detects that the time "00.30" is an instant prior to the time "22.30" supplied by the detector 3. The detector 13 now supplies a control signal to an output 14, which is applied to the detector 2 by way of a control signal input 15. Under the influence of this control signal the detector 2 now generates a date incremented by one on its output 4: namely, the date August 25. Under the influence of the controls signals applied to the memory 8 by the control unit 10 the time "00.30" is now stored as the starting time in the storage location $r_5$, $c_1$ and as the end time in the storage location $r_4$, $c_2$. The cursor position is stored in the storage location $r_5$, $c_3$ and the date incremented by one is stored in the storage location $r_5$, $c_4$. Finally, if this can be derived from the teletext page, the end time "01.00" of the fifth program is stored in the storage location $r_5$, $c_2$.

If the end time cannot be derived from the teletext page, which means that the last row on the teletext page of FIG. 2 is absent, the time detector 3 can generate an end time which is, for example, three hours later than the starting time of the last program. This end time can then be stored in the storage location $r_5$, $c_2$ as a default value. The memory 8 may comprise more columns for the storage of information relating to VPS (Video-Programm-System) as currently used in Germany, see the above mentioned article in Funkschau.

The video recorder is now programmed as follows. By means of the cursor a program as appearing on the teletext display can now be selected, for example, the second program which is a talkshow and which immediately follows the 8 o'clock news. By applying a programming control signal, which can be applied to the video recorder for example by the remote control unit and which, in FIG. 1, is applied to the memories 8 and 9 via the terminal 17, the second row of the memory 8, which may contain VPS information can be read out and this information can be stored in the programming memory 9. In a similar way the video recorder can be programmed to record the fourth program (the film) and the fifth program (the news). By way of example, the contents of the programming memory 9 is shown diagrammatically in FIG. 4.

On the basis of the data in the programming memory 9 the video recorder can subsequently record the programmed items automatically.

FIG. 5 shows the device in FIG. 1 in more detail, in particular the detector 13 in FIG. 1. The detector 13 comprises a memory 20 and a comparator 21. The input of the detector 13 is coupled to the input of the memory 20 and to an input of the comparator 21. The output of the memory is also coupled to a (second) input of the comparator. The output of the comparator 21 is coupled to the output 14 of the detector 13.

If a time, such as the time "22.30" which is the starting time of the film, is transferred to the output 5 of the detector 3 this time is stored not only in the memory 8 under the influence of a control signal by way of the line 12 but also in the memory 20 under the influence of a control signal applied to the memory 20 by way of the line 22.

The time "22.30" is stored in the memory 20 with a certain delay, after the date has been stored in the memory 8 in the storage location $r_4$, $c_4$ corresponding to the fourth program.

Subsequently, the time "00.30" appears on the output 5. The time "22.30" stored in the memory 20 is applied to the input 23 of the comparator 21 and the time "00.30" is applied to the input 24 of this comparator 21.

The comparator 21 detects that the time applied to its input 24 is an instant prior to the time applied to its input 23. On the basis of this the comparator 21 supplies a control signal, which is applied to the output 14. In response to this control signal the date detector 2 supplies a date corresponding to the detected date incremented by one day.

Figure 6:
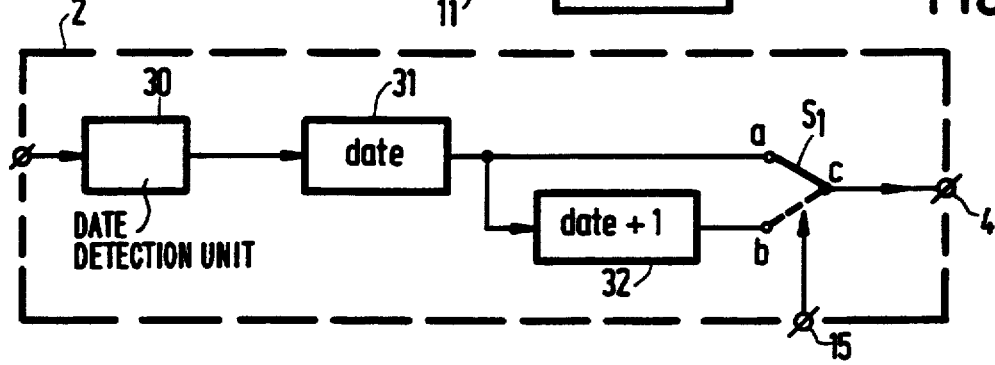
FIG. 6 shows the date detector of the device in FIG. 1, in more detail.

FIG. 6 shows an example of a date detector 2 by means of which this can be realised. The detector 2 comprises a detection unit 30 which can detect a date. This date is subsequently stored in a memory 31. The detector 2 comprises a second memory 32 in which a date incremented by one day is stored. The outputs of the memories 31 and 32 are coupled to terminals a and b respectively of switching means $S_1$, in the form of a controllable switch.

In the normal situation, for times before midnight, the switch $S_1$ is in position a–c. However, if the time "00.30" is applied to the output 5, the comparator 21, as stated hereinbefore, generates the control signal, which is applied to the switch $S_1$ by way of the control signal input 15. Under the influence of this control signal the switch $S_1$ is set to position b–c, so that the date incremented by one is supplied to the output 4.

It is to be noted that in a teletext page as shown by way of example in FIG. 2, which is composed in conformity with the VPT standard, the date of August 25 is inserted in the teletext information of this page, namely between the row with the film of 22.30 and the row with the news of 00.30. This date need not necessarily be displayed on the screen. The date detector 2, however, is capable of deriving this date from the teletext information of this page and storing it in the memory 31. Moreover, upon detection of this second date the line from the control signal input 15 to the switch $S_1$ is interrupted (not shown), so that the switch $S_1$ cannot change over to position b–c.

Figure 7:
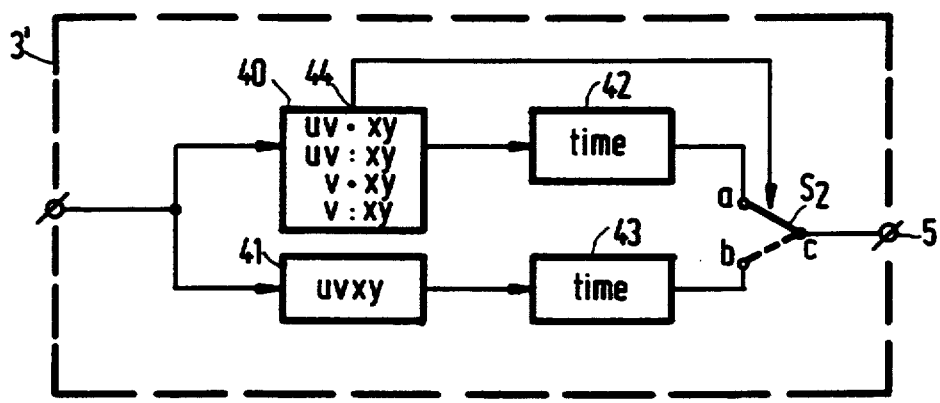
FIG. 7 shows the time detector of the device in FIG. 1 in more detail.

FIG. 7 shows the time detector 3 in FIG. 1 in more detail, which detector bears the reference numeral 3'. The detector 3' comprises a unit 40 for detecting time information included in the teletext page in a manner as described hereinbefore. The detector 3' further comprises a unit 41 which is adapted to recognise exactly four consecutive characters in the form of digits in the teletext information. The number uv should comply with: $00 \leq u \leq 24$ and the number xy should comply with $00 \leq x \leq 59$. If these requirements are met for four consecutive characters, the information of these four characters is always detected as a time. It is obvious that neither the character preceding nor the character following these four characters should be a digit.

The reason that at least four characters in the form of a digit are detected and not at least three characters in the form of digits is that teletext the page numbers are expressed in three digits. A page number could then be identified as a time, which is of course undesirable.

An entire teletext page is searched for the presence of time information. Times detected by the unit 40 are stored in the memory 42 and times detected by the unit 41 are stored in the memory 43. Outputs of the memories 42 and 43 are coupled to the terminal a and b respectively of switching means $S_2$, in the form of a controllable switch. The terminal c of the switch $S_2$ is coupled to the input 5 of the detector 3'.

If the unit 40 has not detected any time information in conformity with one of the standard notations the unit 40 will apply a control signal to the switch $S_2$ by way of a control signal output 44 in order to set this switch to position b–c.

Time information detected by the unit 41 and stored in the memory 43 can now be applied to the output 5 by way of the switch $S_2$.

If the unit 40 detects a time a second control signal is generated via the output 44 in such a manner that the switch $S_2$ is set to position a–c. The times detected by the unit 40 and stored in the memory 42 can now be transferred to the output 5.

It is to be noted that the invention is not limited to the embodiments disclosed herein. The invention also relates to those embodiments which differ therefrom in aspect which are not relevant to the invention. The object of the invention is to use one or both steps in a video recorder, so that an improved programming of the video recorder can be achieved. The step(s) may be implemented in hardware, as described with reference to the Figures. Another possibility is to realise the step(s) by means of software.

I claim:

1. A device for programming a video recorder using time and date information contained in a teletext page, which device comprises an input terminal for receiving the information contained in a teletext page, a date detector for detecting a date present in the information of the teletext page, and a time detector for detecting a time present in the information of the teletext page, wherein the improvement comprises: the time detector includes means for detecting time information from at least four consecutive characters in the information of the teletext page, in a form other than exactly four consecutive digits, for detecting time information in the form of exactly four consecutive digits in the information of the teletext page, and for accepting the four consecutive digits as a time unless the time detector has detected time information in a form other than exactly said four consecutive digits in the information of the teletext page.

2. A device as claimed in claim 1, further comprising means for assigning a detected date detected by the date detector to a time detected from a teletext page by the time detector, and means for assigning an incremented date, equal to the detected date incremented by one day, to the detected time if a time subsequently detected from the same teletext page by the time detector represents an instant prior to the previously detected time.

3. A device as claimed in claim 2, wherein the date detector includes a control signal input and an output, the device further comprises a comparator for comparing a first time detected from a teletext page with a second time subsequently detected from the teletext page, the comparator including a comparator output coupled to the control signal to the date detector and means for supplying a first control signal to the comparator output if the second time represents an instant later than the first time and to supply a second control signal if the second time represents an instant prior to the first time, wherein the date detector includes means for transferring the detected date to its output when the first control signal is applied and to transfer the incremented date to its output when the second control signal is applied.

4. A device as claimed in claim 1, wherein the time detector comprises first detection means for detecting exactly four consecutive characters in the form of digits in the information of the teletext page and second detection means for detecting time information in the teletext page in a form other than exactly four consecutive digits, the first and second detection means including respective outputs;

the device further comprising controllable switching means including a control signal input, a first terminal coupled to the output of the first detection means, a second terminal coupled to the output of the second detection means, and a third terminal connected to an output of the time detector;

the second detection means further including a control signal output coupled to the control signal input of the switching means, and means for generating a first control signal upon detection of time information in a form other than exactly four consecutive digits in a teletext page and a second control signal in the absence from a teletext page of time information in a form other than exactly four consecutive digits;

the switching means coupling the first terminal to the third terminal in response to the receipt of the second control signal at the control signal input and coupling the second terminal to the third terminal upon receipt of the first control signal at the control signal input.

5. A device as claimed in claim 3, wherein the time detector comprises first detection means for detecting exactly four consecutive characters in the form of digits in the information of the teletext page and second detection means for detecting time information in the teletext page in a form other than exactly four consecutive digits, the first and second detection means including respective outputs;

the device further comprising controllable switching means including a control signal input, a first terminal coupled to an output of the first detection means, a second terminal coupled to an output of the second detection means, and a third terminal connected to an output of the time detector;

the second detection means further including a control signal output coupled to the control signal input of the switching means, and means for generating a first control signal upon detection of time information in a form other than exactly four consecutive digits in a teletext-page and a second control signal in the absence from a teletext page of time information in a form other than exactly four consecutive digits;

the switching means coupling the first terminal to the third terminal in response to the receipt of the second control signal at the control signal input and coupling the second terminal to the third terminal upon receipt of the first control signal at the control signal input.

6. A device as claimed in claim 2, wherein the time detector comprises first detection means for detecting exactly four consecutive characters in the form of digits in the information of the teletext page and second detection means for detecting time information in the teletext page in a form other than exactly four consecutive digits, the first and second detection means including respective outputs;

the device further comprising controllable switching means including a control signal input, a first terminal coupled to an output of the first detection means, a second terminal coupled to an output of the second detection means, and a third terminal connected to an output of the time detector;

the second detection means further including a control signal output coupled to the control signal input of the switching means, and means for generating a first control signal upon detection of time information in a form other than exactly four consecutive digits in a teletext page and a second control signal in the absence from a teletext page of time information in a form other than exactly four consecutive digits;

the switching means coupling the first terminal to the third terminal in response to the receipt of the second control signal at the control signal input and coupling the second terminal to the third terminal upon receipt of the first control signal at the control signal input.

7. A video recorder, comprising
a) a programming memory; and
b) programming meals for loading the programming memory with information derived from time and date information contained in a displayed teletext page, the programming means including:
1) an input terminal for receiving the information contained in the teletext page,
2) date detection means for detecting a date present in the information of the teletext page, and
3) time detection means for detecting a time present in the teletext page in the form of exactly four consecutive digits in the teletext page, for detecting a time present in the information of the teletext page in a form other than four consecutive digits, and for accepting the four consecutive digits as a time unless a time has been detected in a form other than exactly four consecutive digits.

8. A video recorder as claimed in claim 7, further comprising means for assigning a detected date detected by the date detection means to a time detected from a teletext page by the time detection means, and means for assigning an incremented date, equal to the detected date incremented by one day, to the detected time if a time subsequently detected from the same teletext page by the time detection means represents an instant prior to the previously detected time.

9. A video recorder as claimed in claim 8, wherein
the date detection means includes a control signal input and an output, and
the recorder further comprises a comparator for comparing a first time detected from a teletext page with a second time subsequently detected from the teletext page, the comparator including a comparator output coupled to the control signal input of the date detection means and means for supplying a first control signal to the comparator output if the second time represents an instant later than the first time and to supply a second control signal if the second time represents an instant prior to the first time, and wherein the date detection means includes means for transferring the detected date to said output thereof when the first control signal is applied and to transfer the incremented date to said output thereof when the second control signal is applied.

10. A video recorder as claimed in claim 9, wherein the time detection means comprises first detection means for detecting exactly four consecutive characters in the form of digits in the information of the teletext page and second detection means for detecting time information in the teletext page in a form other than exactly four consecutive digits, the first and second detection means including respective outputs;
the device further comprising controllable switching means including a control signal input, a first terminal coupled to the output of the first detection means, a second terminal coupled to the output of the second detection means, and a third terminal connected to an output of the time detection means;
the second detection means further including a control signal output coupled to the control signal input of the switching means, and means for generating a first control signal upon detection of time information in a form other than exactly four consecutive digits in a teletext page and a second control signal in the absence from a teletext page of time information in a form other than exactly four consecutive digits;
the switching means coupling the first terminal to the third terminal in response to the receipt of the second control signal at the control signal input and coupling the second terminal to the third terminal upon receipt of the first control signal at the control signal input.

11. A video recorder as claimed in claim 8, wherein the time detection means comprises first detection means for detecting exactly four consecutive characters in the form of digits in the information of the teletext page and second detection means for detecting time information in the teletext page in a form other than exactly four consecutive digits, the first and second detection means including respective outputs;
the device further comprising controllable switching means including a control signal input, a first terminal coupled to the output of the first detection means, a second terminal coupled to the output of the second detection means, and a third terminal connected to an output of the time detection means;
the second detection means further including a control signal output coupled to the control signal input of the switching means, and means for generating a first control signal upon detection of time information in a form other than exactly four consecutive digits in a teletext page and a second control signal in the absence-from a teletext page of time information in a form other than exactly four consecutive digits;
the switching means coupling the first terminal to the third terminal in response to the receipt of the second control signal at the control signal input and coupling the second terminal to the third terminal upon receipt of the first control signal at the control signal input.

12. A video recorder as claimed in claim 7, wherein the time detection means comprises first detection means for detecting exactly four consecutive characters in the form of digits in the information of the teletext page and second detection means for detecting time information in the teletext page in a form other than exactly four consecutive digits, the first and second detection means including respective outputs;
the device further comprising controllable switching means including a control signal input, a first terminal coupled to the output of the first detection means, a second terminal coupled to the output of the second detection means, and a third terminal connected to an output of the time detection means;
the second detection means further including a control signal output coupled to the control signal input of the switching means, and means for generating a first control signal upon detection of time information in a form other than exactly four consecutive digits in a teletext page and a second control signal in the absence from a teletext page of time information in a form other than exactly four consecutive digits;
the switching means coupling the first terminal to the third terminal in response to the receipt of the second control signal at the control signal input and coupling the second terminal to the third terminal upon receipt of the first control signal at the control signal input.

13. A device for programming a video recorder, comprising:
a) an input terminal for receiving the information contained in a teletext page;
b) date detection means for detecting a date present in the information of the teletext page;
c) time detection means for detecting a time present in the information of the teletext page;
d) means for assigning a date detected by the date detection means to a time detected by the time detection means; and
e) means for assigning an incremented date, equal to the detected date incremented by one day, to the detected time if a time subsequently detected from the teletext page represents an instant prier to the previously detected time.

14. A device as claimed in claim 13, wherein the date detection means includes a control signal input and an output, the device further comprises a comparator for comparing a first time detected from a teletext page with a second time subsequently detected from the teletext page, the comparator including a comparator output coupled to the control signal input of the date detection means and means for supplying a first control signal to the comparator output if the second time represents an instant later than the first time and to supply a second control signal if the second time represents an instant prior to the first time, and wherein the date detection means includes means for transferring the detected date to its output when the first control signal is applied and to transfer the incremented date to its output when the second control signal is applied.

* * * * *